United States Patent
Leonow et al.

(10) Patent No.: US 11,733,658 B2
(45) Date of Patent: Aug. 22, 2023

(54) CONTROLLER AND METHOD FOR ADAPTIVE TWO-POSITION CONTROL

(71) Applicant: RUHR-UNIVERSITÄT BOCHUM, Bochum Nordrhein-Westfalen (DE)

(72) Inventors: Sebastian Leonow, Bochum Nordrhein-Westfalen (DE); Martin Moennigmann, Bochum Nordrhein-Westfalen (DE)

(73) Assignee: RUHR-UNIVERSITAT BOCHUM, Bochum Nordrhein-Westfalen (DE)

(*) Notice: Subject to any disclaimer, the term of this patent is extended or adjusted under 35 U.S.C. 154(b) by 51 days.

(21) Appl. No.: 17/054,276

(22) PCT Filed: Jun. 11, 2019

(86) PCT No.: PCT/EP2019/065215
§ 371 (c)(1),
(2) Date: Nov. 10, 2020

(87) PCT Pub. No.: WO2020/001974
PCT Pub. Date: Jan. 2, 2020

(65) Prior Publication Data
US 2021/0247725 A1    Aug. 12, 2021

(30) Foreign Application Priority Data
Jun. 25, 2018 (DE) .................. 10 2018 004 989.3

(51) Int. Cl.
*G05B 13/02* (2006.01)
(52) U.S. Cl.
CPC ................. *G05B 13/0245* (2013.01)
(58) Field of Classification Search
CPC .............................. G05B 13/0245
See application file for complete search history.

(56) References Cited

U.S. PATENT DOCUMENTS 8,786,329 B1* 7/2014 Terrovitis ............... H03K 3/017
327/119
2015/0308034 A1* 10/2015 Cavarretta .............. D06F 58/34
62/238.7
(Continued)

FOREIGN PATENT DOCUMENTS

DE    2510992    9/1976
DE    291134 B  12/1989
(Continued)

*Primary Examiner* — Kenneth M Lo
*Assistant Examiner* — Mohammed Shafayet
(74) *Attorney, Agent, or Firm* — Andrew Wilford (57) ABSTRACT

The invention relates to a method for the two-position control of an actuator (1) on the basis of a binary sensor signal (y) of a sensor unit (2), which senses a process variable (P), which can be influenced by the actuator (1), in such a way that the sensor unit outputs a first sensor signal value (y1) when a first switching value (Sw1) is exceeded and a second sensor signal value (y0) when a second switching value (Sw1, Sw2) is fallen below, wherein: the actuator (1) is controlled with a manipulated variable (u), which assumes either a first control value (u1) or a second control value (u2); the first control value (u1) and the second control value (u2) are dynamically adapted during the operation of the actuator (1), in dependence on a fall time (t_fall) corresponding to the duration of the first sensor signal value (y1) and a rise time (t_rise) corresponding to the duration of the second sensor signal value (y0), in such a way that the first and second control values converge. The invention further relates to a two-position controller (10) designed to carry out the method and to an actuator (1) comprising said two-position controller (10).

28 Claims, 4 Drawing Sheets

(56) References Cited

U.S. PATENT DOCUMENTS

| | | | |
|---|---|---|---|
| 2017/0234920 A1* | 8/2017 | Nair | H01F 7/064 |
| | | | 324/423 |
| 2019/0117920 A1* | 4/2019 | Lacey | A61M 16/18 |
| 2020/0208739 A1* | 7/2020 | Nakagawa | F16K 31/06 |

FOREIGN PATENT DOCUMENTS

| | | |
|---|---|---|
| DE | 102013007026 A | 10/2014 |
| EP | 2034260 A | 3/2009 |

* cited by examiner

CONTROLLER AND METHOD FOR ADAPTIVE TWO-POSITION CONTROL

CROSS REFERENCE TO RELATED APPLICATIONS

This application is the US-national stage of PCT application PCT/EP2019/065215 filed 11 Jun. 2019 and claiming the priority of German patent application 102018004989.3 itself filed 25 Jun. 2018.

FIELD OF THE INVENTION

The invention relates to a method for two-point control of an actuator, based on a binary sensor signal of a sensor that detects a process variable that can be influenced by the actuator in such a way that it outputs a first sensor signal value when a first switching value is exceeded and a second sensor signal value when a second switching value is not reached, the actuator being controlled by a manipulated variable that accepts either a first manipulated variable or a second manipulated variable.

The invention also relates to a two-point controller for controlling an actuator on the basis of a binary sensor signal, having an input for a binary sensor signal and an output for a manipulated variable for controlling an actuator. The invention also relates to an actuator that has the two-point controller according to the invention.

BACKGROUND OF THE INVENTION

Two-point controllers are discontinuous controllers that control an actuator with two control values, where an upper or a lower control value is outputted depending on whether the actual value is above or below the set point. A binary output signal with two manipulated variable values is thus outputted on the basis of a binary sensor signal from a sensor that detects a process variable. Two-point controllers are usually used when the manipulated variable is not continuously variable, but can only switch between two states (e.g. on/off), and/or when the sensor does not output a constant signal corresponding to the process variable, but rather provides a binary sensor signal.

With a two-point controller, a control loop for controlling a process variable, for example a level or a temperature, can be implemented with an inexpensive sensor that supplies a binary output signal, for example with a float switch or a bimetal switch. For example, a pump of a sewage pumping station can be operated by a two-point controller in which the pump is only switched on or off cyclically or as required, with activation or deactivation being controlled by a float switch as a function of the level in a pump sump. However, frequent on-off changes lead to increased wear and tear and increased energy consumption.

With actuators, whose manipulated variable is continuously adjustable, i.e. in which the manipulated variable can be controlled by intermediate values between the on and off states, it is possible to adapt the manipulated variable value to requirements. For example, in the case of pumps that have a frequency converter for speed control, the speed can be controlled as a manipulated variable value as required, thus preventing repetitive switching on and off. According to DE 10 2013 007 026, a level sensor is required for the needs-based control of the speed, which continuously determines the level and sets an energy-optimized speed based on the level. The disadvantage is that a level sensor is required, which is more maintenance intensive and expensive compared to a sensor that emits a binary signal.

OBJECT OF THE INVENTION

The object of the invention is to provide a simple, robust and inexpensive sensor and a method for controlling an actuator that operates the actuator in an energy-efficient and low-wear manner.

In addition, it is the object of the invention to provide a controller that, on the basis of a simple, robust and inexpensive sensor, enables energy-efficient and low-wear control of an actuator.

Furthermore, it is the object of the underlying invention to provide an actuator that can be operated in an energy-efficient and low-wear manner by the controller according to the invention.

SUMMARY OF THE INVENTION

The underlying method is characterized in that the first control value of the actuator and the second control value of the actuator are dynamically adjusted as a function of a fall time that corresponds to the duration of the first sensor signal value, and a rise time that corresponds to the duration of the second sensor signal value, during operation of the actuator so that they converge to one another.

In a method that has the features of the generic invention, the manipulated variable of the actuator is set to the first manipulated variable or the second manipulated variable, depending on the sensor signal value. For example, a heater that heats a container or room and represents an actuator within the meaning of the invention is switched off when a certain process variable or a temperature is reached and the first sensor signal value is applied. A drop in the temperature in the container or room leads to the temperature dropping below a second switching value, so that the sensor outputs a second sensor signal value and the heater is switched on to heat the container or room. After the temperature is exceeded, the heater is switched off again. As a result, the heater is switched on and off alternately, the temperature fluctuating between the switching values. The setting of the first switching value and the subsequent second switching value is referred to below as a cycle.

The first signal value is present in the period between exceeding the first switching value and dropping below the second switching value. During this period, the actuator is controlled by a manipulated variable that causes the process variable to drop; accordingly, the duration of the first signal value is referred to as the fall time. The second signal value is present in the period between dropping below the second switching value and exceeding the first switching value. During this period, the actuator is controlled by a control value that leads to an increase in the process variable; accordingly, the duration of the second signal value is referred to as the rise time.

For example, the heater that heats a container or room and for which the temperature is the process variable is controlled by a lower heating power that is so low that the temperature in the container drops when the first switching value has been exceeded and the first sensor signal value is present. The heater is operated with the lower heating power until the temperature drops below the second switching value and the sensor delivers the second sensor signal. As soon as the second sensor signal is applied, the heater is activated in such a way that it is operated with a higher heating output that is so high that the temperature in the container or room increases. The actuator is controlled by the signal for the higher heating power as long as the second sensor signal is applied. The fall time and rise time are determined from the duration of the sensor signals.

The control values are dynamically adjusted based on the rise time and the fall time. A dynamic adaptation within the meaning of the invention is understood to mean a new calculation of the first control value and the second control value for each subsequent cycle.

The method according to the invention provides that the first manipulated variable and the second manipulated variable are adapted dynamically, specifically in such a way that the two values converge. The actuator is thus controlled by each new cycle with a manipulated variable in which the difference between the first and second manipulated variable is smaller than in the previous cycle. As the amplitude of the change in the manipulated variable decreases, the switching losses and the wear and tear on the actuator decrease. In addition, the switching frequency decreases, since the difference between the first and second control value becomes smaller and smaller and the process variable changes more slowly. The decrease in the switching frequency also leads to a reduction in wear and tear and energy consumption.

For example, in a heater that is intended to heat a container or room, the difference between the lower and the upper heating output in a heater operated with the method becomes smaller and smaller from cycle to cycle, so that the amplitude of the change in the manipulated variable gradually decreases. The switching frequency also decreases, since the temperature of the container or room changes more slowly as the amplitude of the change in the manipulated variable decreases. In this way, wear and switching losses are reduced, among other things.

The first manipulated variable and the second manipulated variable are preferably adapted dynamically in such a way that the fall time and the rise time gradually assume the same value. The first and the second manipulated variable are adjusted accordingly after each cycle so that the fall time and the rise time approach one another. For example, to increase the fall time compared to the rise time, the first control value is increased less than the second control value is reduced, so that the process variable changes more slowly when it drops. By adjusting the fall time to the rise time, the first and the second manipulated variables fluctuate symmetrically around a value. This value represents the optimal operating point in a control loop in which the process role is constantly changing. In the example of the heater that heats a container or room, this means that the value represents the optimal operating point with constant heat loss. In this way, symmetrical switching of the actuator around an optimal operating point is advantageously achieved, which allows the actuator to be operated efficiently with little wear.

One embodiment of the invention is characterized in that the method repeatedly comprises the following steps:
- a first step in which the actuator is controlled by the first manipulated variable that corresponds to the difference between a manipulated variable mean value and a manipulated variable amplitude, and the fall time is determined when the sensor outputs the first sensor signal value,
- a second step in which the actuator is controlled by the second manipulated variable that corresponds to the sum of the manipulated variable mean and the manipulated variable amplitude, and the rise time is determined when the sensor outputs the second sensor signal value, and
- a third step in which a new manipulated variable mean value is determined from the fall time and the rise time.

In this embodiment of the invention, the first manipulated variable and the second manipulated variable are set on the basis of a manipulated variable mean value and a manipulated variable amplitude. In the event that the sensor outputs the first sensor signal value, the actuator is controlled by the first control value, where this corresponds to the difference between the manipulated variable mean value and the manipulated variable amplitude. In a control loop in which the process variable reacts positively to a change in the manipulated variable, such control of the actuator leads to the process variable dropping. In this case, the duration of the first sensor signal value corresponds to the fall time. As soon as the second sensor signal value is applied, i.e. the process variable has dropped below the second switching value, the second step is carried out, the actuator being controlled by the second manipulated variable that corresponds to the sum of the manipulated variable mean value and the manipulated variable amplitude. This leads to the process variable increasing when the second step is carried out. That is, until the first switching value has been exceeded, which leads to the sensor outputting the first sensor signal value. The duration of the second sensor signal value corresponds to the rise time. In the third step, a new manipulated variable mean value is determined on the basis of the determined fall time and rise time, on the basis of which the first manipulated variable and the second manipulated variable are recalculated when the first and second steps are repeated. By repeating the first, second and third steps, targeted control of the manipulated variable around the manipulated variable mean value is achieved, the manipulated variable fluctuating around the manipulated variable mean value with the manipulated variable amplitude. The determination of the manipulated variable mean value and the manipulated variable amplitude is advantageously carried out on the basis of measured values; the determination of these response curves does not require any user intervention.

In the case of a heater that heats a container or room, this means, for example, that the heater is activated in the first step with a signal for a heating output that corresponds to the difference between an average heating output and an amplitude, the temperature inside the container or the reduced heating output. After dropping below the second switching value, the sensor outputs the second sensor signal value and the second step is carried out, the heater being controlled by an upper heating output that corresponds to the sum of an average heating output and the amplitude. As a result, the temperature in the container or room increases. As soon as the first switching value is exceeded, the sensor outputs the first sensor signal value, the duration of this value corresponding to the rise times. In the third step, on the basis of the fall time and the rise time, a new mean heating power is calculated as the manipulated variable mean value that is used when the first and second steps are carried out again. The heating output of the heater thus fluctuates with the amplitude around the mean heating output.

An alternative embodiment of the invention provides that the method repeatedly comprises the following steps:
- a first step in which the actuator is controlled by the first manipulated variable that corresponds to the difference between a manipulated variable mean value and a manipulated variable amplitude, and in which the rise time is determined when the sensor outputs the second sensor signal value, a second step in which the actuator is controlled by the second manipulated variable that corresponds to the sum of the manipulated variable mean value and the manipulated variable amplitude, and in which the fall time is determined when the sensor outputs the first sensor signal value, and a third step in which a new manipulated variable mean value is determined from the fall time and the rise time.

This variant relates to control loops in which the process variable reacts negatively to an increase in the manipulated variable. For example, an increase in the speed of a pump, which is intended to empty a container, leads to the outflow being increased and the level dropping, i.e. the process variable reacting negatively. In this case, triggering the actuator with a first manipulated variable, which corresponds to the difference between the manipulated variable mean and the manipulated variable amplitude, results in the process variable increasing. The process variable is increased when the sensor outputs the second sensor signal value, that is, as soon as the value drops below the second switching value until the first switching value is exceeded. As soon as the first switching value is exceeded, the sensor outputs the first sensor signal value and the second step is carried out in which the actuator is controlled by the second manipulated variable that corresponds to the sum of the manipulated variable mean value and the manipulated variable amplitude. This leads to the process variable dropping, the fall time being determined as the duration of the first sensor signal value. The third step is based on the fall time and rise time, and a new manipulated variable mean value is calculated that in turn is used when the first and second steps are carried out again. In the example of the pump that empties a container, this would mean that the pump is controlled in the first step with a lower speed that corresponds to the difference between a mean speed and a speed amplitude and is controlled in the second step with an upper speed that corresponds to the sum of an average speed and a speed amplitude. The outflow from the container is thus controlled in such a way that the level fluctuates back and forth between the first switching value and the second switching value.

The method preferably has a fourth step in which the manipulated variable amplitude is reduced.

By reducing the manipulated variable amplitude, the first manipulated variable and the second manipulated variable are adapted in such a way that they converge to one another. As a consequence of this, the number of switching steps to be carried out by the actuator decreases so that the actuator is operated with less wear and tear and more energy efficiency. For example, the speed of a pump is reduced so that switching losses are reduced when switching between the lower and the upper speed.

A preferred embodiment of the method provides that the fourth method step is carried out repeatedly until a minimum manipulated variable amplitude other than zero is reached.

A repeated reduction in the manipulated variable amplitude leads to the first manipulated variable converging with the second manipulated variable. In the method according to the invention, it is important to determine the fall time and the rise time in order to adapt the first and second control values on the basis of these factors, if such a minimal fluctuation of the process variable is desired. In this way the actuator is controlled by at least one manipulated variable, in which the manipulated variable fluctuates around a manipulated variable mean value with a minimum manipulated variable amplitude. Such an operation is particularly necessary in order to avoid possible malfunctions of the control loop, which lead to an increase or a reduction in the rise time or the fall time. The minimum manipulated variable amplitude is preferably selected in such a way that the energy losses and wear and tear in the actuator are as minimal as possible.

In one embodiment of the method according to the invention the fall time and the rise time are compared with one another, such that the new mean value of the control value is increased if the rise time is greater than the fall time, or the new control value mean value is reduced if the rise time is less than the fall time.

By comparing the fall time with the rise time, one can determine whether the manipulated variable mean value represents the optimum operating point in a control loop in which the process variable changes constantly, influenced from outside. A difference between the fall time and the rise time indicates that a new correction of the control value mean value is required. The manipulated variable value must be increased if the rise time is greater than the fall time. It is necessary to reduce the mean value of the control value if the rise time is less than the fall time. A constant adaptation of the manipulated variable mean value to the change in the process variable is thus achieved.

One embodiment of the invention provides that the new manipulated variable mean value according to $$u\_mean = u\_mean + k*\text{delta}$$

is determined, where k is a correction factor that depends on the fall time and the rise time. The correction factor preferably depends on the relationship between fall time and rise time.

A correction factor that depends on the fall time and the rise time is added to the manipulated variable mean value in order to adapt the manipulated variable mean value to changes in the process variable. The factor depends in particular on the relationship between the rise time and the fall time, so that an adjustment between the rise time and the fall time is achieved with a multiple correction of the control value mean. The correction factor is multiplied by the manipulated variable amplitude, which leads to the fact that the correction becomes smaller and smaller from cycle to cycle as the manipulated variable amplitude is reduced and the manipulated variable mean value approaches an optimal value. An approximation takes place in particular when a change in the process variable induced from outside is constant, for example when the flow rate is constant over time for a container to be filled.

The correction factor is preferably adjusted in the method according to the invention according to $$k = 1 - t\_\text{fall}/t\_\text{rise}$$

when the rise time is greater than the fall time, and according to $$k = t\_\text{rise}/t\_\text{fall} - 1$$

when the rise time is less than the fall time.

In this way, the new manipulated variable mean value is increased if the rise time is greater than the fall time, and decreased if the rise time is less than the fall time, depending on the relationship between rise time and fall time. If the rise time and fall time are identical, k=0 so that the new mean value of the manipulated variable is not corrected.

An alternative variant of the method provides that the correction factor $$k = 1 - \text{sqrt}(t\_\text{fall}/t\_\text{rise})$$

is when the rise time is greater than the fall time, and the correction factor $$k=\sqrt{t\_rise/t\_fall}-1$$

is when the rise time is less than the fall time.

The formation of the root from the relationship between rise time and fall time has the advantage that the correction is gentle, or the change in the new manipulated variable mean is smaller than when the simple ratio between rise time and fall time is used.

In a preferred embodiment of the method, a starting step is first carried out in which the actuator is controlled by a manipulated variable that causes the first switching value to be increased or the second switching value to be undershot.

The start step is used to bring the control loop into a state in which the first four process steps are repeated and the process variables alternate between the first switching value and the second switching value. In the case of a control loop in which the process variable is positively dependent on the manipulated variable and is below the switching values, a manipulated variable is set that causes the process variable to rise until it exceeds the first switching value. The above-described steps are then carried out, in which case a first step is carried out in which the actuator is controlled by the first manipulated variable that corresponds to the difference between a manipulated variable mean value and a manipulated variable amplitude, so that the process variable decreases. Subsequently, the above-described steps are carried out in such a way that the process variable alternates around the switching values, in particular alternating between the first and the second switching value. In a control loop in which the process variable depends negatively on the manipulated variable and in which the process variable is greater than the switching values, the actuator is controlled by a manipulated variable which leads to a decrease in the process variable. As soon as the value drops below the second switching value, in this case, in a first step, the actuator is controlled by a first control value that corresponds to the difference between a control value mean value and an control value amplitude, so that the process value increases. The above-described process steps are then carried out in such a way that the process variable alternates with the switching values. The starting step is preferably carried out in order to bring the control loop into a state in which it can be operated alternately on the basis of the binary sensor signal of a sensor.

A preferred embodiment of the invention provides that the fall time and/or the rise time are compared with an average value from the two times and a reset is performed in the event of a deviation. In particular, the manipulated variable mean value (u_mean) and the manipulated variable amplitude (delta) are reset to their starting values.

The comparison between the rise time and the fall time is made in order to detect any malfunctions in the control loop, since a significant change in the process variable is noticeable in a change in the rise time or the fall time. If such a deviation between the rise time and the fall time is detected, the manipulated variable is reset, in particular by setting the manipulated variable mean value and the manipulated variable amplitude back to their starting values. In this way, malfunctions in the process variable are recognized and eliminated.

In one embodiment of the invention the first switching value and the second switching value have the same value.

This embodiment aims at a sensor that has only one switching value, a first sensor signal being output when this switching value is exceeded and a second signal value is outputted when this switching value is not reached. In this case, the inertia of the control loop means that the process variable alternates around the individual switching value. By determining the fall time that corresponds to the duration of the first signal value, and the rise time that corresponds to the duration of the second signal value, the first control value and the second control value can be adapted such that they converge to one another. The above-described process steps can be applied analogously. This embodiment corresponds to the simplest form of a sensor, for example a float switch or a thermostat.

The actuator is preferably a pump, a valve, a heater or a cooling device.

The underlying method can be used for actuators whose manipulated variable is continuously adjustable. In the case of a valve, the process variable is then, for example, a flow rate, a level or a pressure, the process variable for example is the degree of opening of the valve. For a heating or cooling device, the process variable is, for example, a temperature, the manipulated variable in the heater being electrically generated power. The actuator is preferably a speed-controlled pump, the manipulated variable being the speed of the pump. In the case of the above-described actuators, on the basis of a binary sensor signal, the underlying method can be used to ensure low-wear and energy-efficient operation.

The invention also relates to a two-position controller for controlling an actuator on the basis of a binary sensor signal, having an input for the binary sensor signal and an output for a manipulated variable for controlling the actuator, the two-position controller being set up to carry out the method according to the invention.

Such a two-point controller can preferably be implemented by a microcontroller that executes the underlying method. It is particularly preferred to implement the underlying method using an analog circuit, since this can be implemented with simple components such as operational amplifiers and logic gates, and this provides advantages, for example in certification for safety-critical applications.

The invention also relates to an actuator that has a controller according to the invention.

BRIEF DESCRIPTION OF THE INVENTION

Embodiments of the invention are described below with reference to the drawing in which.

SPECIFIC DESCRIPTION OF THE INVENTION

Figure 1A:
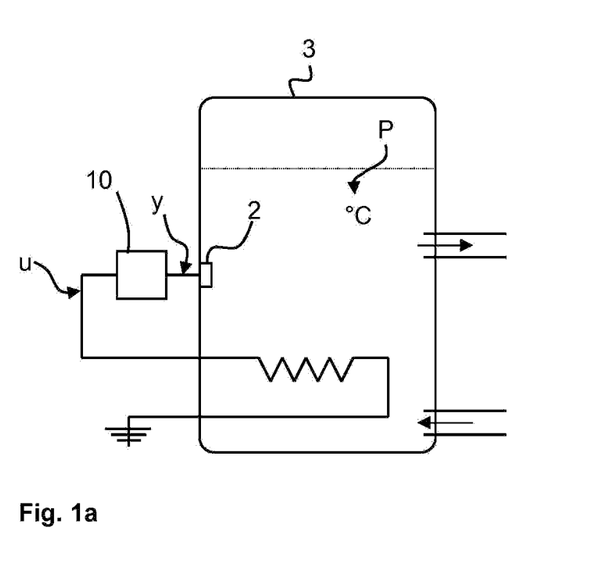
FIG. 1a shows an application in which the process variable depends positively from the manipulated variable, namely a container or room that is heated by a heater.

An application of the underlying method is shown in FIG. 1a where the process variable P is positively influenced by a manipulated variable u of an actuator 1. This is a container 3 that is heated by a heater 1, the level P, in the example the temperature, being measured within the container by a sensor 2. The sensor delivers a binary sensor signal y that depends on the level P. In particular, the sensor 2 outputs a first sensor signal value y1 when the process variable P exceeds a first switching value Sw1. If the process variable P drops below a second switching value Sw2, the sensor 2 outputs a second sensor signal value y0. In the case shown, the heater 1 is the actuator and the heat outputted by the heater 1 is the manipulated variable u that is controlled by the two-point controller 10. The straight arrows represent the direction of flow of the medium to be heated. The flow rate of the medium varies as required.

Figure 1B:
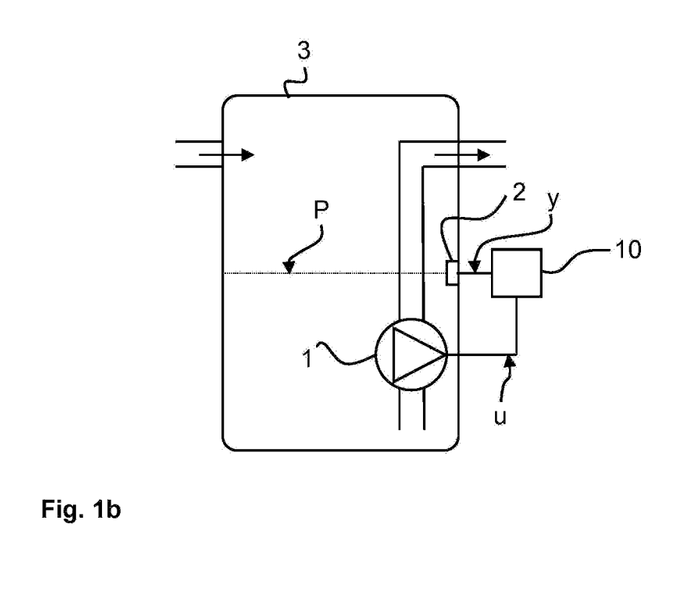
FIG. 1B shows an application in which the process variable is negatively related to the manipulated variable, namely a container that is emptied by a pump.

FIG. 1B shows an embodiment in which the process variable P depends negatively on the manipulated variable u. This is a container 3 that is emptied by a pump 1, the level P inside the container 3 being measured by a sensor 2 that produces a binary sensor signal y. In this application, the level P drops as the manipulated variable u or the speed of the pump 1 increases. The manipulated variable u is controlled by the two-point controller 10 that is set up to carry out the method according to the invention.

Figure 2A:
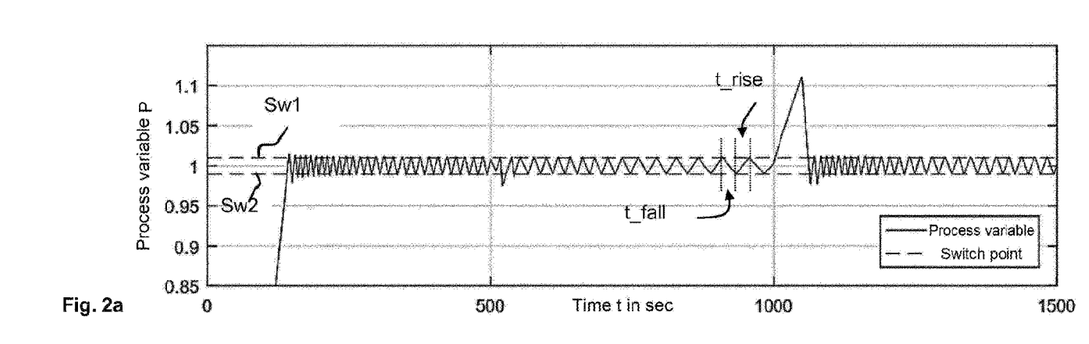
FIG. 2a is a time graph of a process variable that is determined that influences the underlying process.
Figure 2B:
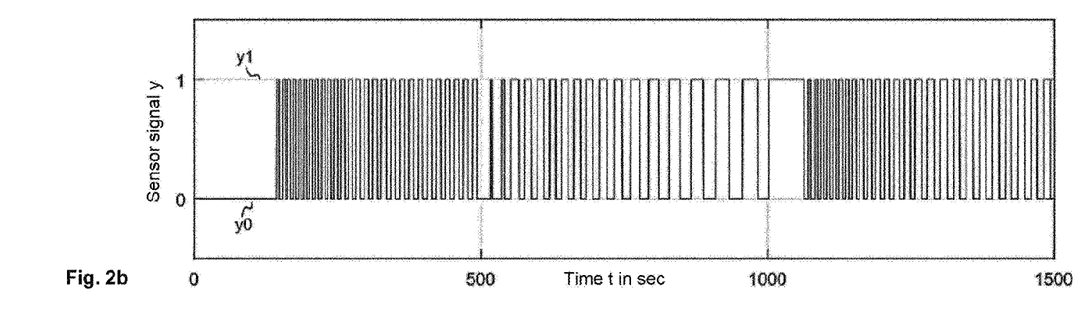
FIG. 2b is a time graph of a sensor signal that a single sensor outputs.
Figure 2C:
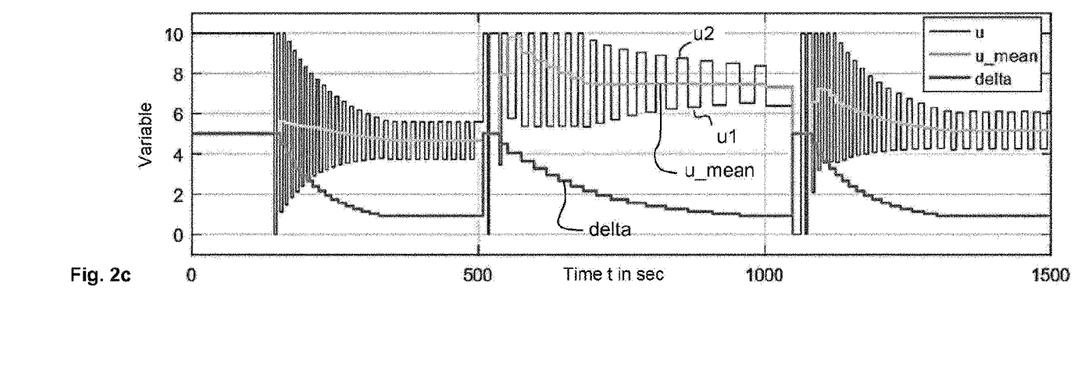
FIG. 2c is a time graph of the manipulated variable that controls the actuator, as well as the corresponding manipulated variable mean value and the corresponding manipulated variable amplitude.

FIGS. 2a, 2b, and 2c show an example of the method with respect to time, the process variable P depends positively on the manipulated variable u, i.e. when the manipulated variable u increases. The time t is given in seconds. With the maximum manipulated variable (u=10), as it is at the beginning of the time line, the process variable P increases. FIG. 2b shows this sensor signal y, the first sensor signal value y1 being applied when the process variable P exceeds the first switching value Sw1. The first signal value y1 is applied until the process variable P drops below the second switching value Sw2, whereupon the second sensor outputs signal value y0. As shown in FIG. 2c, the controlled variable u of the actuator 1 is controlled based on the binary sensor signal y, in which case, manipulated variable u assumes a first manipulated variable u1 when the first sensor signal value y1 is present. When the second sensor signal value y0 is present, the manipulated variable rises to the second manipulated variable u2. This can be seen particularly well in the time range between t=800 sec and t=1000 sec, since the switching times between the first control value u1 and the second control value u2 are relatively large. As long as the actuator 1 with the first manipulated variable u1 is controlled, the process variable P drops, so that the duration of the first sensor signal value y1 corresponds to a fall time t_fall. The process variable P drops if that actuator 1 assumes the second manipulated variable u2, so that the duration of the second sensor signal value y0 corresponds to a rise time t_rise.

The durations of the sensor signal values y1 and y2 are used for the underlying method so that the first control value u1 and the second control value u2 adjust when operating the actuator 1 dynamically so that they converge to one another. As can be seen in FIG. 2c, the first control value u1 and the second control value u2 converge when the actuator 1 is in operation. This makes the switching steps between the first manipulated variable u1 and the second manipulated variable u2 smaller, which leads to a reduction in switching losses when operating the actuator 1. In this way, more energy-efficient and less expensive operation of the actuator 1, for example a pump or a heater, can be attained. The convergence of the first control value u1 and the second control value u2 ensures that the differences between the control values are smaller, so that the change in process variable P slowly follows. A slower change in the process variable P has the consequence that the fall time t_fall and the rise time t_rise increase from cycle to cycle, so that the manipulated variable u is switched less and less. This also leads to the fact that the actuator 1 consumes less energy and the wear on actuator 1 is reduced. The convergence of the control values u1 and u2 can be set particularly well in the time ranges around t=200 sec, t=700 sec and t=1200 sec.

The first control value u1 and the second control value u2 are adapted so that the fall time t_fall and the rise time t_rise converge toward the same value. Alignment of fall time t_fall to rise time t_rise can be seen in FIG. 2c in the time ranges before t=500 sec, before t=1000 sec and before t=1500 sec.

The first setting value u1 and the second setting value u2 are preferably determined using a manipulated variable mean u_mean and a manipulated variable amplitude delta are calculated. in the illustrated case, the first manipulated variable u1 corresponds to the difference between the manipulated variable mean u_mean and the manipulated variable amplitude delta. It is applied when the sensor 2 outputs the first sensor signal value y1, i.e. when the process variable P exceeds the first switching value Sw1. As a result of the control with a reduced manipulated variable u, the process variable P, until it drops below the second switching value Sw2 and the sensor 2 outputs the second sensor signal value y2. The duration of the first sensor signal value y1 corresponds to the fall time t_fall. As soon as the second sensor signal value y2 is present, the actuator 1 is controlled by the second manipulated variable u2 that then corresponds to sum of the manipulated variable mean u_mean and the manipulated variable amplitude delta. The increased manipulated variable u causes the process variable P to rise, whereupon the second sensor signal value y2 is applied until the process variable P has exceeded the first switching value Sw1. Then the actuator 1 is controlled by the first manipulated variable u1, with a newly determined manipulated variable mean u_mean and a newly determined manipulated variable amplitude delta that are determined on the basis of the fall time t_fall and the rise time t_rise. As can be seen from FIG. 2c, the manipulated variable amplitude is successively reduced, so that the first control value u1 and the second control value u2 converge to one another. In addition, the manipulated variable mean value is successively adjusted to u_mean, which after a plurality of cycles converges to a value at which the fall time t_fall and rise time t_rise are the same.

Figure 3:
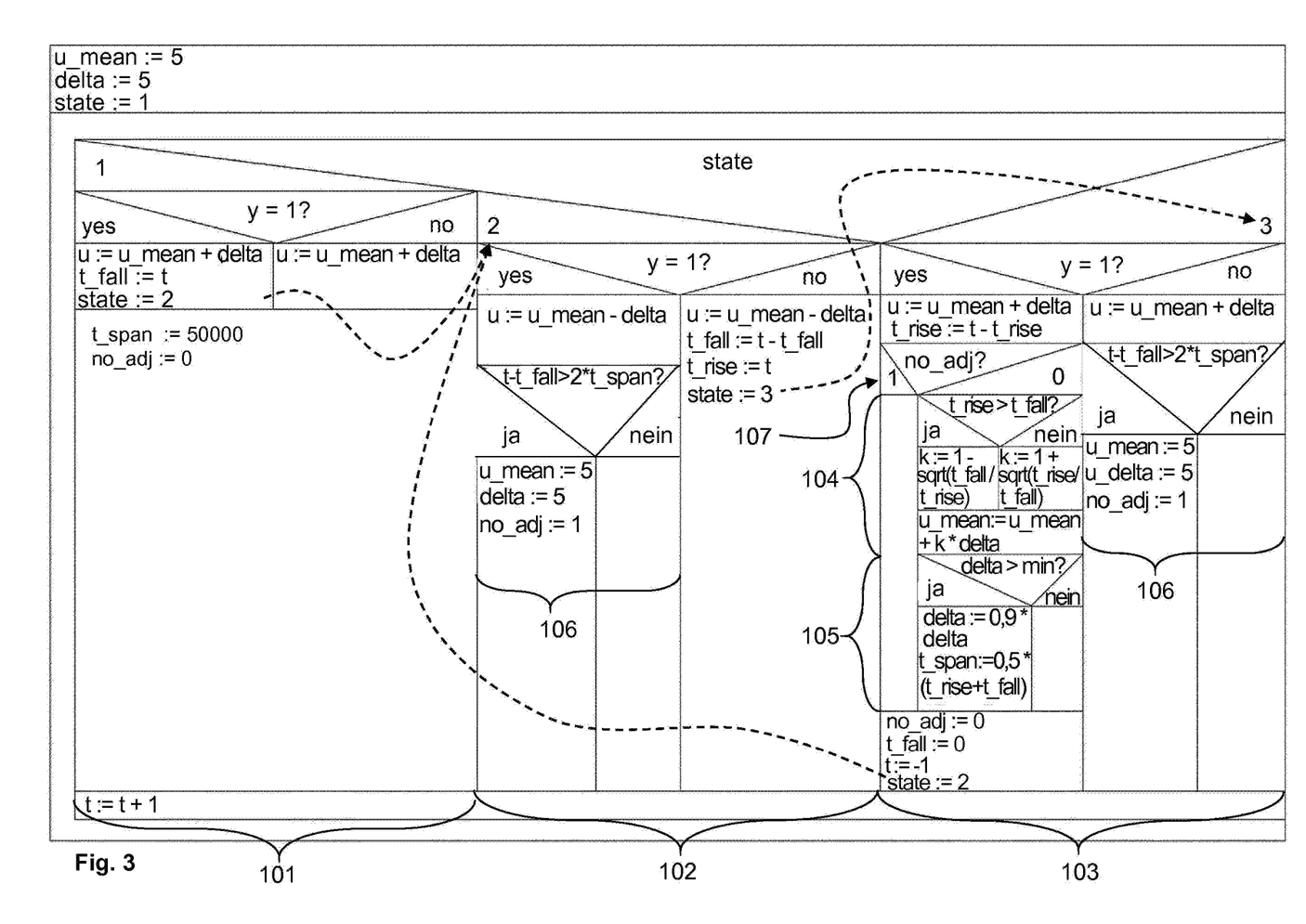
FIG. 3 is a schematic diagram showing the features of the underlying method that lead to the time courses from FIGS. 2a, 2b and 2c, and FIG. 4 schematically shows a two-point controller according to the invention formed by analog components.

The time curves from FIGS. 2a, 2b and 2c are based on a method that is shown in the process diagram of FIG. 3 that is a structured chart. The manipulated variable u is dependent on the state of the control procedure controlled, with a distinction between states 1, 2 and 3.

State 1 corresponds to a start step 101 in which the actuator 1 is controlled by a manipulated variable u which leads to the first switching value Sw1 being exceeded, or the first sensor signal value y1, i.e. y=1, is present. For this, a manipulated variable u is applied, which corresponds to the sum of the manipulated variable mean u_mean and the manipulated variable amplitude corresponds to delta, where the output values u_mean=5 and delta=5. As soon as the first sensor signal value y1 is outputted by the sensor 2, so y=1, is switched to state 2 that is represented by state=2 and a dashed arrow.

The state 2 corresponds to a first step 102 in which the actuator with a manipulated variable u that is the difference between the manipulated variable mean u_mean and that corresponds to the manipulated variable amplitude delta. For the first cycle this means that u=0 because u_mean=5 and delta=5. The control with such a manipulated variable u leads to increases of the process variable P. As soon as the process variable P reaches the first switching value Sw1, the sensor 2 outputs the second sensor signal value y0, that is y=0, so that the right column of state 2 is executed. The fall time t_fall is determined and change in the state 3 changed, which is represented by state=3 and a dashed arrow.

State 3 corresponds to a second step 103 in which a manipulated variable u is set such that of the sum of the manipulated variable mean u_mean corresponds to the manipulated variable amplitude delta. In the first cycle the manipulated variable is u=10, since the output values u_mean=5 and delta=5. Because of the control with the maximum manipulated variable, the process variable P increases, whereby the sensor 2 continues to output the second sensor signal value y0, so that say y=0. As soon as the process variable P exceeds the first switching value Sw1, the sensor 2 outputs the first sensor signal value y1, so y=1. As a result, the left column of state 3 is executed, and the rise time t_rise is determined.

Subsequently, in a third step 104 based on the rise time t_rise and the fall time t_fall a new manipulated variable mean value u_mean is determined. Here, when determining the new manipulated variable mean value u_mean, it is first asked whether the rise time t_rise is greater than the fall time t_fall. If this is the case, a correction factor is determined according to $$k=1-\text{sqrt}(t\_\text{fall}/t\_\text{rise})$$

The new manipulated variable mean u_mean is calculated based on the correction factor k where $$u\_\text{mean}=u\_\text{mean}+k*\text{delta}$$

In this case, the ratio of fall time t_fall and rise time t_rise is greater than 1, so that the correction factor k is positive and thus the new manipulated variable mean value is greater than that previous manipulated variable mean. In the event that the fall time is greater than the rise time, the correction factor k is calculated according to $$k=\text{sqrt}(t\_\text{rise}/t\_\text{fall})-1$$

In this case the correction factor k is negative because the ratio of both times is less than 1. The new manipulated variable mean value u_mean is therefore smaller than the old manipulated variable mean u_mean. Such a correction ensures that the new manipulated variable mean value u_mean approaches a value at which the rise time t_rise is equal to the fall time t_fall. This adaptation of the manipulated variable mean value u_mean is shown in FIG. 2c by the light gray line.

After calculation of the new manipulated variable mean value u_mean, in this embodiment, a fourth step 105 is carried out, in which the manipulated variable amplitude delta is reduced. In the present case, the new manipulated variable amplitude corresponds to 0.9 times the old manipulated variable amplitude delta. If the reduction is repeated, the control amplitude delta thus decreases exponentially. After reducing the manipulated variable amplitude, state 2 is executed, with the newly determined by the calculation of the manipulated variable u being from manipulated variable mean u_mean and the newly determined manipulated variable amplitude delta. In the present case, the manipulated variable u corresponds to the difference between the new control value mean u_mean and the new control value amplitude delta. Due to the process, variable P decreases again when controlled by a reduced manipulated value. As soon as the process variable P drops below the second switching value Sw2, the sensor 2 outputs the second sensor signal value y0, i.e. y=0, so that the controller is switched to state 3, i.e. the second step 103 executes. Accordingly, the first step 102 becomes the second step 103, the third step 104 and the fourth step 105 are executed successively and repeatedly, and the manipulated variable mean value u_mean is adapted and the manipulated variable amplitude delta is gradually reduced. After several cycles, the manipulated variable mean value u_mean approaches a value at which the fall time t_fall is equal to the rise time t_rise.

The manipulated variable amplitude delta is reduced until a minimum manipulated variable amplitude value delta min is reached. In the diagram of FIG. 2c this is in the ranges before t=500 sec, before t=1,000 sec and before t=1500 sec the case. A minimal manipulated variable amplitude delta min is required to determine fall times t_fall and rise times t_rise then seek to be able to determine when the manipulated variable mean value u_mean reaches a value in which the rise time t_rise is equal to the fall time t_fall. The continuing fluctuation of the process variable P and the associated repeated determination of the times t_fall and t_rise is necessary in order to be able to recognize any disturbances of process role P from outside.

In the present embodiment, in state 2, when the first sensor signal value y1 (y=1) is applied, a test step 106 is carried out in which the fall time is compared with a mean value from the two times t_span (see FIG. 3 left column State 2). If the fall time t_fall is more than twice as great as twice the mean value from both times t_span, a reset takes place by adding the manipulated variable u_mean and the manipulated variable amplitude delta are reset to their initial values. In the present case u_mean=5 and delta=5. In addition, the control value suppression no_adj=1 is switched on, so that in the cycle that follows an error, no new mean value of the manipulated variable u_mean and the manipulated variable amplitude delta are calculated. In FIG. 3, the query of the disturbance is represented at 107. Suppression of the recalculation ensures that the control quickly reacts to malfunctions and can adjust so that the process variable P does not deviate too much from the desired value. In state 3, test step 106 is carried out when the first sensor signal value y0 (y=0) is applied.

In FIGS. 2a, 2b and 2c, a first disturbance is induced at time t=500 sec and a second disturbance induced at time t=1000 sec. The first problem is to correct the manipulated variable mean value u_mean upward, so that after several switching cycles a manipulated variable mean value u_mean is set that is larger than the manipulated variable mean value u_mean at t=500 sec. In the example of heating a container with a heater, this disturbance can be synonymous with the fact that the temperature has dropped due to an opening of the container so that the output of the heater must be increased to compensate for the temperature drop. The second fault is corrected when the mean value of the manipulated variable u_mean goes down, with a value after approximately t=1350 sec that sets the mean value of the manipulated variable u_mean that corresponds to that at t=500 sec. The first failure will be thus reduced by the second disturbance, or the temperature drop due to the opening compensated for the first failure.

In this embodiment, the manipulated variable u can be varied between 0 and 10 and represents an abstract value. It can be, for example, a voltage with which an actuator is operated. Based on the application example from FIG. 1a, the heating power might correspond to a value that is proportional to the manipulated variable u from FIG. 2c.

In an unillustrated variant the method derived from the diagram in FIG. 3 can be used with an application example of FIG. 1B.

Figure 4:
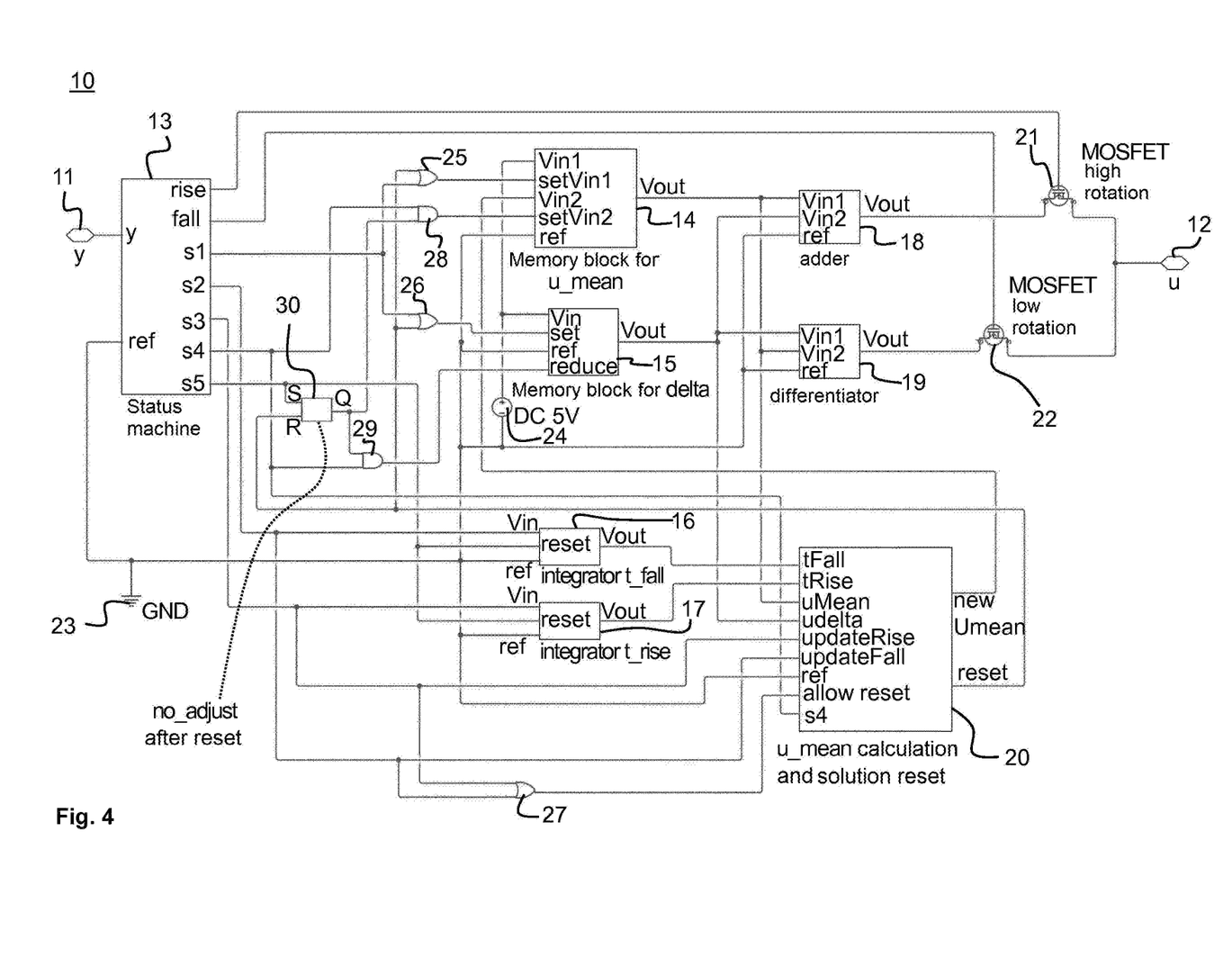

An embodiment of a controller 10 according to the invention is shown in FIG. 4. The circuit diagram shown corresponds to an upper structure level in which the individual blocks are each formed from analog circuits. The binary output signal y of the sensor 2 is applied in this case to an input 11 and by analog components, for example operational amplifiers and storage elements, outputted as manipulated variable u at output 12. The binary sensor signal y is applied to an input of a status machine 13 that outputs five states s1 to s5. State s1 is used to initialize the controller. State s2 is active when the first sensor signal value y1, i.e. y=1, is present. State s3 is active when the second sensor signal value y2 is present, i.e. y=0. In state s4 the new manipulated variable u_mean is calculated. In state s5, the manipulated variable amplitude is reduced to delta and the timing is reset. The states are changed to the sequence 1, 2, 3, 4, 5, 2, 3, 4, 5, 2 . . . by the status machine 13. The status machine 13 outputs a signal rise, with which a first switch 21 is controlled, so that the second control value u2 is present at the output 12, which leads to an increase in the process variable P. If the status machine 13 gives a drop signal, a switch 22 is activated so that the first control value u1 is present at output 12 and the process variable P drops.

In the state s1 that corresponds to the starting step 101, a first memory block 14 for the manipulated variable mean value u_mean set a voltage Vin1 that corresponds to the voltage from a voltage source 24, in this case 5 volts. This supply voltage is set a second memory block 15 for the manipulated variable amplitude delta. Both memory blocks 14 and 15 are sample-and-hold circuits with two specifiable input values. The first memory block 14 and the second memory block supply output voltages of 5 volts that are applied to the inputs of an adder 18 and a differentiator 19 are applied. The adder 18 supplies the sum of the two output voltages, so that when the first switch 21 is activated at the output u=u_mean+delta is applied. The differentiator 19 delivers as output voltage the difference between the voltages, so that a manipulated variable u=u_mean—delta is applied to the output 12 when the second switch 22 is activated.

In state s2, that is, when the first sensor signal value y1 is present, a signal is sent to an input of a first integrator 16 whose duration corresponds is outputted as voltage Vout by the integrator 16. This voltage is applied to a mean value calculation block 20 as t_fall.

If the state s3 is active, that is when the second sensor signal value y0 is present, a signal is applied to a second integrator 17 whose output voltage Vout corresponds to the rise time t_rise. The output voltage of the second integrator 17 is also used as the input of the average value calculation block 20. The mean value calculation block 20 determines from the fall time t_fall, the rise time t_rise, the manipulated variable mean u_mean and the manipulated variable amplitude delta a new manipulated variable mean value newUmean that is sent to an input Vin2 of the first memory block 14.

As soon as the state s4 is activated, the new manipulated variable mean value newUmean is calculated and set as output voltage by application to the input setVin2 of the first memory block 14. This voltage is applied to the adder 18 and the differentiator 19.

When the state s5 is subsequently activated, the first integrator 16 and the second and the integrator 17 are reset.

In addition, the value for the manipulated variable amplitude delta is reduced in the memory block 15. The manipulated variable u at output 12 depends on the newly set manipulated variable mean value of the first memory block 14 and the reduced manipulated variable amplitude of the second memory block 15.

The manipulated variable amplitude will not be reduced if the mean value calculation block 20 is reset by a flip-flop 30 and the second AND gate 29 together. In the same way a new manipulated variable mean value u_mean is not set if the reset is present, since the output s4 of the status machine and the output Q of the flip-flop 30 are linked via a first AND gate 28 to each other. When the reset is activated, a first OR gate 25 at the first memory block 14 sets the supply voltage of the voltage source 24 as the manipulated variable mean value. In addition, a second OR gate 26 is activated when the reset is activated in the second memory block 15, and the supply voltage of the voltage source 24 is set as the manipulated variable amplitude. The reset is set by the mean value calculation block 20 if the fall time t_fall or the rise time t_rise deviates from the mean value of both times t_span.

With the circuit of FIG. 4, the underlying method can be handled by an analog circuit, with only simple components such as operational amplifiers and logic gates required. Such an analog circuit can be designed as an integrated module that is integrated into an actuator 1 that is for example, a pump, a valve, a heater or a cooling system. Advantageously, one can do this without significant effort to implement an energy-efficient and low-wear control of an actuator 1, if a sensor 2 is used that makes a binary sensor signal y available.

The invention claimed is:

1. A method for two-point control of an actuator acting on a process variable, the method comprising steps of:
generating a binary sensor signal with a sensor that detects the process variable such that the sensor outputs a first sensor signal value when the process variable exceeds a first switching value and the sensor outputs a second sensor signal value when the process value falls below a second switching value;
controlling the actuator by a manipulated variable having only one of a first control value and a second control value, and
dynamically adjusting the first control value and the second control value in dependence on a fall time representing a first duration of the first sensor signal value and a rise time representing a second duration of the second sensor signal value such that during operation of the actuator the rise time and the fall time converge toward each other by repeatedly carrying out
a first sub step in which
the actuator is controlled with the first control value that is set to represent a difference between a mean value of the manipulated variable and an amplitude of the manipulated variable, and
the fall time is determined on the basis of the first sensor signal value;
a second sub step in which
the actuator is controlled with the second control value that is set to represent a sum of the mean value of the manipulated variable and the amplitude of the manipulated variable, and
the rise time is determined sensor on the basis of the second sensor signal value; and a third sub step in which
    a new mean value of the manipulated variable is determined on the basis of the fall time and the rise time.

2. The method according to claim 1, wherein the first control value and the second control value are adjusted dynamically so that the fall time and the rise time converge to a same value.

3. The method according to claim 1, further comprising: a fourth step of reducing the amplitude of the manipulated variable.

4. The method according to claim 3, wherein the fourth method step is carried out until the amplitude of the manipulated variable reaches a minimum.

5. The method according to claim 1, wherein the fall time and the rise time are compared with each other such that
    the new mean value of the manipulated variable is increased when the rise time is greater than the fall time, or
    the new mean value of the manipulated variable is reduced when the rise time is smaller than the fall time.

6. The method according to claim 5, wherein the new mean value of the manipulated variable is determined according to $$u\_mean = u\_mean + k*delta, \text{ where}$$

u_mean is the new mean value of the manipulated variable,
delta is the amplitude of the manipulated variable, and
k is a correction factor that depends on a ratio of the fall time and the rise time.

7. The method according to claim 6, wherein the correction factor k is determined according to $$k = 1 - (t\_fall/t\_rise), \text{ where}$$

t_fall is the fall time and
t_rise is the rise time,
when the rise time is greater than the fall time, and
the correction factor k is determined according to $$k = (t\_rise/t\_fall) - 1$$

when the rise time is less than the fall time.

8. The method according to claim 6, wherein the correction factor k is determined according to $$k = 1 - \sqrt{t\_fall/t\_rise} \text{ where}$$

t_fall is the fall time and
t_rise is the rise time
when the rise time is greater than the fall time, and
the correction factor k is determined according to $$k = \sqrt{t\_rise/t\_fall} - 1$$

when the rise time is less than the fall time.

9. The method according to claim 1, further comprising: a start step in which the actuator is controlled with the manipulated variable such that the process variable exceeds the first switching value or falls below the second switching value.

10. The method according to claim 1, further comprising: a test step in which the fall time is compared with an average value obtained from both the rise time and the fall time and, if the fall time is greater than twice the average value, a reset is carried out such that the mean value of the manipulated variable and the amplitude of the manipulated variable are reset to respective initial values.

11. The method according to claim 1, wherein the first switching value and the second switching value have a same value.

12. The method according to claim 1, wherein the actuator is a pump, valve, heater, or cooler.

13. A two-point controller for carrying out the method of claim 1, the two-point controller controlling the actuator based on the binary sensor signal having an input for the binary sensor signal and an output for the manipulated variable.

14. The actuator having the two point controller according to claim 13.

15. A method for two-point control of an actuator acting on a process variable, the method comprising steps of:
    generating a binary sensor signal with a sensor that detects the process variable such that the sensor outputs a first sensor signal value when the process variable exceeds a first switching value and the sensor outputs a second sensor signal value when the process value falls below a second switching value;
    controlling the actuator by a manipulated variable having only one of a first control value or and a second control value, and
    dynamically adjusting the first control value and the second control value in dependence on a fall time representing a first duration of the first sensor signal value and a rise time representing a second duration of the second sensor signal value such that during operation of the actuator the rise time and the fall time converge toward each other by repeatedly carrying out
    a first sub step in which
        the actuator is controlled by with the first control value representing a difference between a mean value of the manipulated variable and an amplitude of the manipulated variable, and
        the rise time is set to represent the second duration of the second sensor signal value and is determined on the basis of the second sensor signal value;
    a second sub step in which
        the actuator is controlled with the second control value that is set to represent a sum of the mean of the manipulated variable and the amplitude of the manipulated variable, and
        the fall time is set to represent the first duration of the first sensor signal value and is determined on the basis of the first sensor signal value; and
    a third sub step in which
        a new mean value of the manipulated variable is determined on the basis of the fall time and the rise time.

16. The method according to claim 15, further comprising:
    a fourth step of reducing the amplitude of the manipulated variable.

17. The method according to claim 16, wherein the fourth step is carried out until the amplitude of the manipulated variable reaches a minimum.

18. The method according to claim 15, wherein the first control value and the second control value are adjusted dynamically so that the fall time and the rise time converge to a same value.

19. The method according to claim 15, wherein the fall time and the rise time are compared with each other such that
    the new mean value of the manipulated variable is increased when the rise time is greater than the fall time, or the new mean value of the manipulated variable is reduced when the rise time is smaller than the fall time.

20. The method according to claim 19, wherein the new mean value of the manipulated variable is determined according to $$u\_mean = u\_mean + k*delta, \text{ where}$$

u_mean is the new mean value of the manipulated variable, delta is the amplitude of the manipulated variable, and k is a correction factor that depends on a ratio of the fall time and the rise time.

21. The method according to claim 20, wherein the correction factor k is determined according to $$k = 1 - (t\_fall/t\_rise), \text{ where}$$

t_fall is the fall time and t_rise is the rise time, when the rise time is greater than the fall time, and the correction factor k is determined according to $$k = (t\_rise/t\_fall) - 1$$

when the rise time is less than the fall time.

22. The method according to claim 20, wherein the correction factor k is determined according to $$k = 1 - \mathrm{sqrt}(t\_fall/t\_rise) \text{ where}$$

t_fall is the fall time and t_rise is the rise time when the rise time is greater than the fall time, and the correction factor k is determined according to $$k = \mathrm{sqrt}(t\_rise/t\_fall) - 1$$

when the rise time is less than the fall time.

23. The method according to claim 15, further comprising:

a start step in which the actuator is controlled with the manipulated variable such that the process variable exceeds the first switching value or falls below the second switching value.

24. The method according to claim 15, further comprising:

a test step in which the fall time is compared with an average value obtained from both the rise time and the fall time and, if the fall time is greater than twice the average value, a reset is carried out such that the mean value of the manipulated variable and the amplitude of the manipulated variable are reset to respective initial values.

25. The method according to claim 15, wherein the first switching value and the second switching value have a same value.

26. The method according to claim 15, wherein the actuator is a pump, valve, heater, or cooler.

27. A two-point controller for carrying out the method of claim 15, the two-point controller controlling the actuator based on the binary sensor signal having an input for the binary sensor signal and an output for the manipulated variable.

28. The actuator having the two point controller according to claim 27.

* * * * *